United States Patent
High et al.

(10) Patent No.: US 10,025,964 B2
(45) Date of Patent: Jul. 17, 2018

(54) SYSTEM AND METHOD FOR TRACKING

(71) Applicant: Wal-Mart Stores, Inc., Bentonville, AR (US)

(72) Inventors: Donald R. High, Noel, MO (US); Brian Gerard McHale, Oldham (GB)

(73) Assignee: WALMART APOLLO, LLC, Bentonville, AR (US)

( * ) Notice: Subject to any disclaimer, the term of this patent is extended or adjusted under 35 U.S.C. 154(b) by 12 days.

(21) Appl. No.: 15/241,848

(22) Filed: Aug. 19, 2016

(65) Prior Publication Data
US 2017/0061181 A1  Mar. 2, 2017

Related U.S. Application Data
(60) Provisional application No. 62/208,862, filed on Aug. 24, 2015.

(51) Int. Cl.
| G06K 7/10 | (2006.01) |
| G06K 19/06 | (2006.01) |
| G06Q 30/06 | (2012.01) |
| G06Q 30/02 | (2012.01) |

(52) U.S. Cl.
CPC ..... *G06K 7/10861* (2013.01); *G06K 7/10732* (2013.01); *G06K 7/10762* (2013.01); *G06K 19/06046* (2013.01); *G06Q 30/0281* (2013.01); *G06Q 30/0613* (2013.01)

(58) Field of Classification Search
None
See application file for complete search history.

(56) References Cited

U.S. PATENT DOCUMENTS

| 7,076,441 | B2 | 7/2006 | Hind et al. | |
| 7,592,911 | B1 | 9/2009 | Hudgens et al. | |
| 7,786,858 | B2* | 8/2010 | Whillock | G06F 17/30793 340/539.12 |
| 8,442,792 | B1* | 5/2013 | Elberbaum | G06F 19/00 702/107 |
| 2002/0165758 | A1* | 11/2002 | Hind | G06Q 10/087 705/7.29 |
| 2006/0044112 | A1 | 3/2006 | Bridgelall | |
| 2010/0075619 | A1 | 3/2010 | Solla et al. | |
| 2010/0227659 | A1* | 9/2010 | Claver | A63B 71/0616 463/6 |
| 2014/0208487 | A1 | 7/2014 | Orientale et al. | |
| 2015/0054621 | A1 | 2/2015 | Lin et al. | |

FOREIGN PATENT DOCUMENTS
CN  203105761 U  8/2013

OTHER PUBLICATIONS
Adams, Derek, "The best kids trackers: Using wearables for child safety", Wearable.com, Jul. 7, 2015; 7 pages.

* cited by examiner

*Primary Examiner* — Kristy A Haupt
(74) *Attorney, Agent, or Firm* — Schmeiser, Olsen & Watts LLP

(57) ABSTRACT

Disclosed is a system and method for tracking people in a retail store. The system uses the retail store's digital map, video cameras, unique identifiers, video analytics, geo location technology and a customer's mobile device. The unique identifiers may be labels on hats using, for example, invisible ink or magnetic ink. The digital map of the retail store is used to track people. The user of the tracking system is able to track their party throughout the store even if the other people in the party do not have a mobile device.

12 Claims, 3 Drawing Sheets

300 providing a customer with a tracking application for a mobile computing device
310 providing the customer with a unique code for each of the at least one additional person
320 wearing the unique code in a manner such as to be visible with video recognition
330

340 activating the unique code on the mobile computing device of the customer by first scanning the unique code and associating the unique code with the tracking application
340 tracking the location of the unique code on the mobile computing device
350

FIG. 3

SYSTEM AND METHOD FOR TRACKING

RELATED APPLICATION

This application claims priority to U.S. Provisional Patent Application Ser. No. 62/208,862, filed on Aug. 24, 2015 entitled "SYSTEM AND METHOD FOR TRACKING," the entirety of which is incorporated by reference herein.

FIELD OF THE INVENTION

The invention relates generally to a method for tracking using a mobile computing device in a retail store, and particularly to a system for allowing customers to track positions of people in their shopping party.

BACKGROUND

Losing someone in your party while shopping is a very common problem. One way to resolve this issue is to call or text the other people in your party asking where they are located or giving your location. However, not everyone has a mobile device, particularly elderly and young children; two groups of individuals who parents and care givers often lose track of.

Accordingly, it is desirable to have a system and method for a customer to track their party throughout the store even if all the members of the party do not have a mobile device utilizing the user's mobile device using a digital map of the store.

BRIEF SUMMARY

Disclosed is a method for customers in a retail store of tracking at least one additional person comprising: providing a customer with a tracking application for a mobile computing device: providing the customer with a unique code for each of the at least one additional person, wherein the unique code is visible through video recognition on each of the at least one additional person; and activating the unique code on the mobile computing device of the customer by first scanning the unique code and associating the unique code with the tracking application, wherein location of the unique code is tracked on the mobile computing device.

Disclosed is a system for customers in a retail store for tracking at least one additional person comprising: a tracking application for a mobile computing device of a customer; a unique code for each of the at least one additional person, wherein the unique code is activated on the mobile computing device of the customer by first scanning the unique code and associating the unique code with the tracking application; and video location technology for tracking the at least one additional person.

In another aspect, disclosed is a method for customers in a retail store of tracking at least one additional person comprising: providing a customer with a tracking application for a mobile computing device: providing the customer with a hat having a unique code for each of the at least one additional person, wherein the unique code is visible through video recognition on each of the at least one additional person; and activating the unique code on the mobile computing device of the customer by first scanning the unique code and associating the unique code with the tracking application, wherein location of the unique code is tracked on the mobile computing device.

In another aspect, provided is a system for customers in a retail store for tracking at least one additional person comprising: a tracking application for a mobile computing device of a customer: a hat having a unique code for each of the at least one additional person, wherein the unique code is activated on the mobile computing device of the customer by first scanning the unique code and associating the unique code with the tracking application; and video location technology for tracking the at least one additional person.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3 illustrates a method of tracking in a retail store.

DETAILED DESCRIPTION

Figure 1:
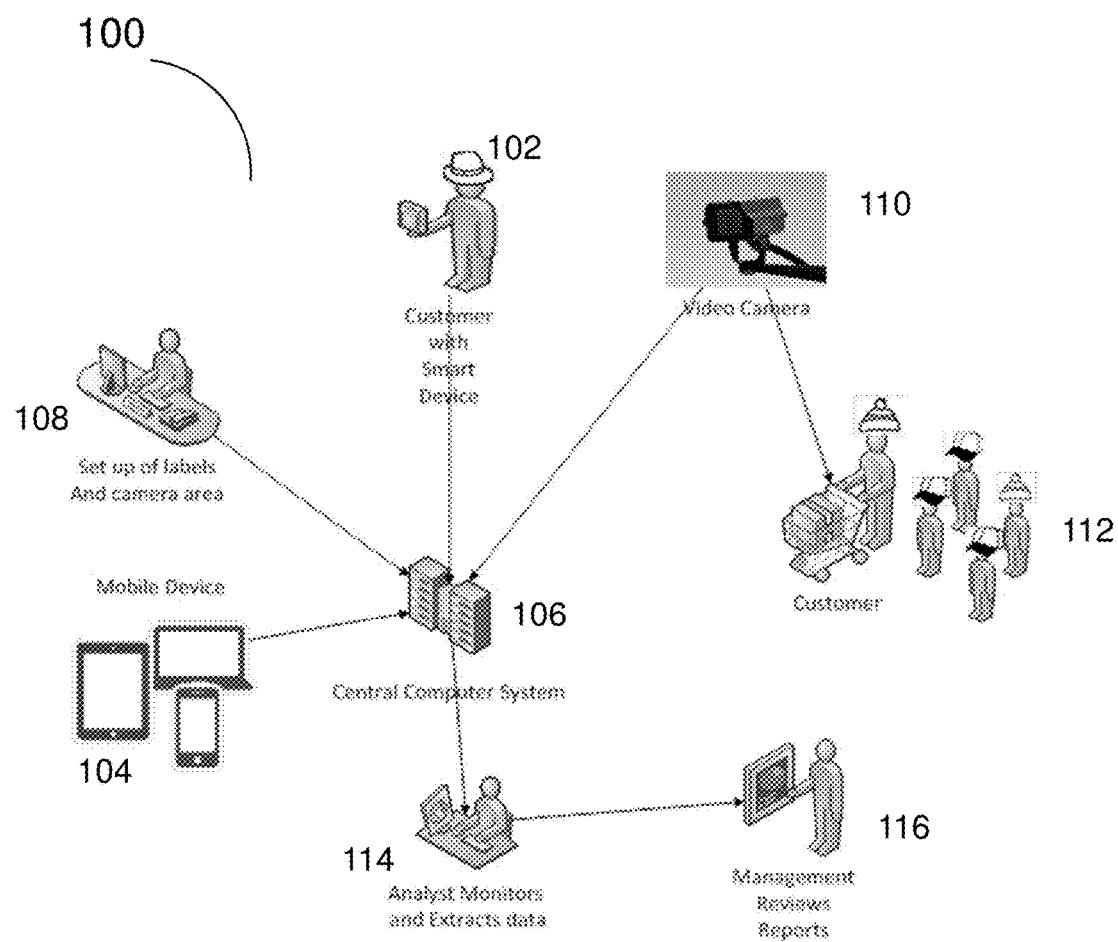
FIG. 1 is an illustrative view of a retail store tracking system.

Mobile computing devices, such as tablets, watches and cell phones are often used by customers as they move about a store. In the disclosed invention, the retail store provides a tracking application to reside on the personal mobile computing devices of customers to track their party through the retail store.

The disclosed invention tracks people in the store by using a store's digital map, video cameras, video analytics, geo location technology, mobile computing devices and unique codes or identifiers. The unique codes or identifiers include, but are not limited to labels, such as self stick labels, labels on hats, labels on scarves and/or labels on other suitable apparel items, as long as the labels are visible by retail store video cameras. The labels are anonymous except to the user. Additionally, the labels may be printed, for example, with invisible ink or magnetic ink.

The method and system provide customers with unique identifiers to wear for tracking throughout the store. Customers may either use the self-sticking label or purchase an apparel item having a label with unique codes (visible or invisible to other customers) which are visible to the store's video cameras. The self stick labels and/or labeled apparel items may be reused for future visits as they are already entered into the system. The customer may test the reused labels as they enter the store. New labels and/or labeled apparel items may always be purchased and added or removed from the customer's tracking application.

The system further provides video recognition of the unique code or identifier on the label and/or the labeled apparel item. Digital retail store maps are used for tracking the unique codes through the retail store. The system still further provides a mobile tracking application for entering and tracking the unique codes or identifiers on a map. The method and system allow the customer to track his/her party on his/her mobile computing device throughout the store even if the other people in the party do not have a mobile computing device. More than one customer in the party may have a mobile computing device.

The disclosed tracking system works through video location technology using the store's video surveillance cameras, central computer system, video analytics, and digital store mapping. The user activates the unique codes on their mobile computing device by first scanning the code and associating it with their account. A central computer system (CCS) captures a digital map of a retail store. Labels are printed and are recorded within the retail store's database. All video cameras are mapped within the digital map of the store as to the area of coverage.

Customers opt into the tracking program and download the tracking application on their mobile computing device. Customers then either receive the self stick label or purchase a labeled apparel item upon entering the retail store. The customer places the labels and/or labeled apparel item on the other members of their party.

The CCS links the customer and all the labels associated to that customer to a map on the customer's mobile computing device application indicating where the customer and where all associated participants are located within the store. The customer does not have to be at the store to track via their mobile computing device. The customer can track remotely. However, the tracked participants must be located somewhere on the retail store's property, as the labels are picked up on or identified when within optical range of the retail store's video cameras and the digital map is of the retail store only.

The disclosed tracking system provides a customer with unique identifiers to wear on their person for tracking throughout the store. The disclosed tracking system works through video location technology using the store's video surveillance cameras, central computer system, video analytics, geo location technology and digital store mapping. The user (customer) activates the codes on their mobile computing device (smart device) by first scanning the code and associating it with their account.

The tracking system uses a computer aided design and drafting (CADD) map of the retail store. The map is separated into grids. The video cameras coverage areas are mapped to the grid. The video camera feeds are fed into the CCS for analysis. When a video camera's images are analyzed and an image has one of the unique codes or identifiers, the CCS knows that the number is associated with a party and can communicate back to the customer the location of the video camera area to the digital map being viewed by the customer as to that person of their party's location. The location may show up as a dot or other indicator on the screen of the mobile computing device in approximately the location of the customer within the camera location grid section.

In one embodiment, as the person is being tracked by the customer's mobile computing device, the customer can click on the dot representing the location of the person on the digital store map display to receive a video feed of that person's position. The customer may watch the video feed until exiting which takes them back to the digital map.

In another embodiment, the customer may also wear a unique code or identifier. The video cameras will track the customer and communicate to the CCS where the customer is located.

In still another embodiment, the unique codes may be placed on other objects within the store for the video cameras to track as they are moved within the store property.

In yet another embodiment, the system provides visible light communication for customer tracking. With visible light communication, the customer's position on the digital map may be based on the visible light transmission numbers of LED smart lights. The photo eye of the customer's mobile computing device receives location transmissions from the LED lights which are sent to the CCS. The LED transmissions are mapped to the digital map of the store. The CCS then uses the digital map to show the customer where they are on their mobile computing device. Other customer tracking, includes, for example, beaconing, and/or with Wi-Fi hot spots.

FIG. 1 is an illustrative view of retail store tracking system 100. Store associate sets up labels and video camera 108 interfaced with Central Computer System 106. Customer 102 with mobile device 104 interfaces with CCS 106. Video camera 110 recognizes labels on customer's party 112 and interfaces with CCS 106. A store analyst 114 monitors and extracts data from CCS 106 and manager 116 reviews data.

Figure 2:
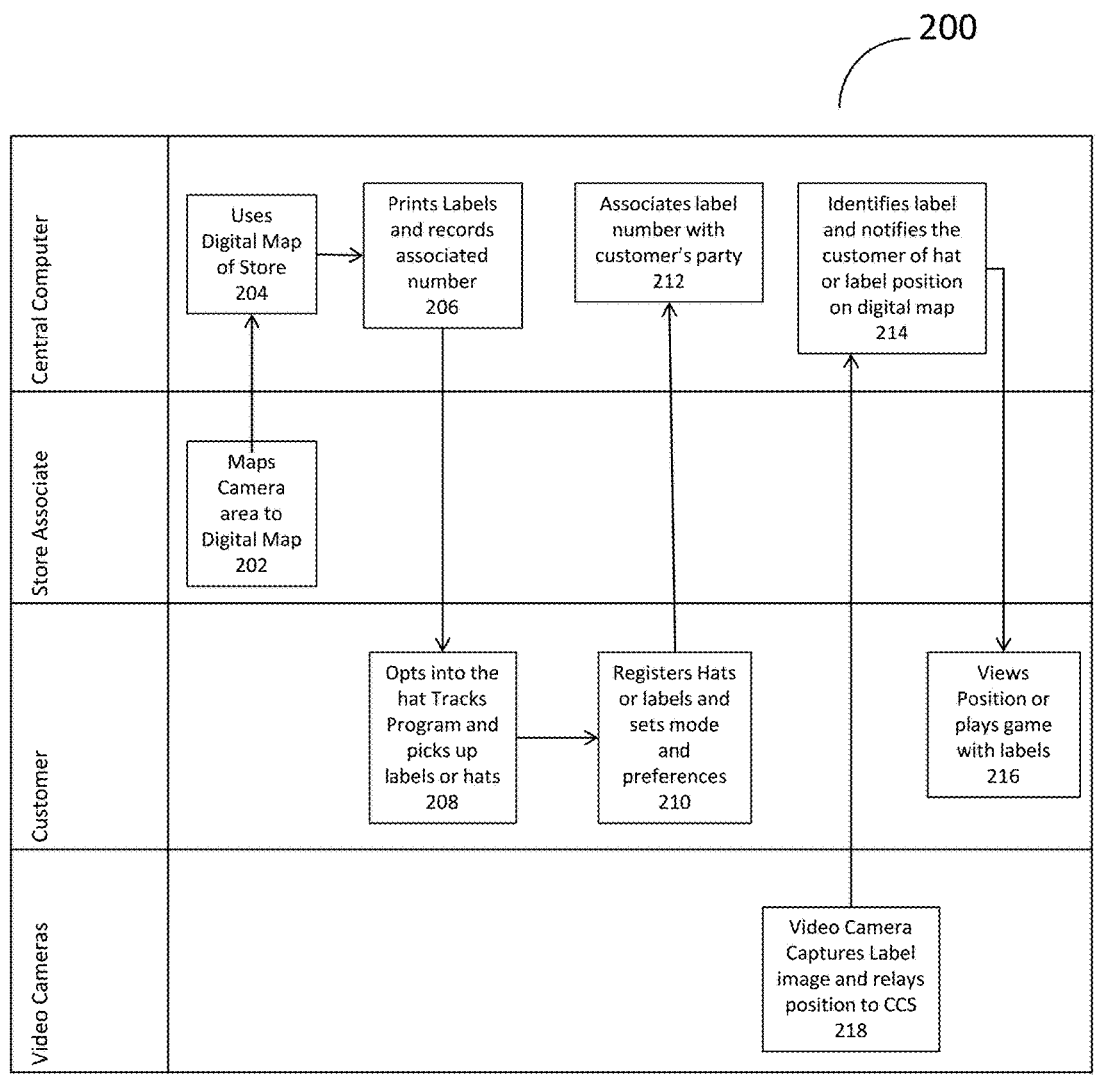
FIG. 2 illustrates a block diagram of a process flow system for tracking in a retail store.

FIG. 2 illustrates a block diagram of process flow system 200 for tracking in a retail store. Store associate maps camera area to digital map 202. Central Computer System (CCS) uses digital map of store 204. CCS prints labels and records associated number 206. Customer opts into tracking program and picks up labels or hats having labels 208. Customer then registers labels or hats having labels 210. CCS associates label number with customer's party 212. Video camera captures label image and relays position to CCS 218. CCS identifies label and notifies customer of label or hat with label position on digital map 214. Customer views position of labels 216.

FIG. 3 illustrates method 300 for customers in a retail store of tracking at least one additional person. Method 300 of tracking at least one additional person in their party includes element 310 providing a customer with a tracking application for a mobile computing device; element 320 providing the customer with a unique code for each of the at least one additional person; element 330 wearing the unique code in a manner such as to be visible with video recognition; element 340 activating the unique code on the mobile computing device of the customer by first scanning the unique code and associating the unique code with the tracking application; and element 350 tracking the location of the unique code on the mobile computing device. Method 300 can include many other elements, such as providing the customer with a label having a unique code or providing the customer with a hat having a unique code.

As will be appreciated by one skilled in the art, aspects of the disclosed system and method for mapping locations in a retail store may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for customers in a retail store of tracking at least one additional person comprising:
    providing a customer with a tracking application for a mobile computing device;
    providing the customer with a unique code for each of the at least one additional person, wherein the unique code is visible through video recognition on each of the at least one additional person; and
    activating the unique code on the mobile computing device of the customer by first scanning the unique code and associating the unique code with the tracking application, wherein location of the unique code is tracked on the mobile computing device.

2. The method of claim 1, wherein the unique code is on a garment.

3. The method of claim 1, wherein the unique code is on a self stick label.

4. The method of claim 1, wherein the unique code is anonymous.

5. The method of claim 1, wherein the unique code is in invisible ink or magnetic ink.

6. The method of claim 1, wherein the video location technology includes the retail store's video surveillance cameras, a central computer system, video analytics, and digital store mapping.

7. The method of claim 6, wherein the unique code is identified by the retail store's video surveillance cameras.

8. The method of claim 6, wherein the digital store mapping is of the retail store.

9. The method of claim 1, wherein the customer is outside the retail store when tracking the at least one additional person.

10. The method of claim 1, wherein the unique code works only in the retail store.

11. The method of claim 1, wherein the customer is also provided a unique code visible with video recognition.

12. The method of claim 1, wherein the customer is tracked with LED smart lighting.

* * * * *